Inventor
Benjamin F. Fitch
By Bates, Gobrick & Teare
Attorneys

Patented Oct. 21, 1930

1,778,852

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

MEANS FOR LEVELING FREIGHT TRUCKS

Application filed November 26, 1928. Serial No. 321,834.

This invention relates to handling of freight in containers comprising removable automobile bodies. Where such containers are intended to be moved horizontally between a truck and a platform, it is desirable that provision be made for obtaining alignment of the truck floor with the platform floor. It is obvious that as the trucks are spring supported, there will be a variation in the level of these surfaces depending upon the load within the container. It is also desirable that provision be made for obtaining floor alignment notwithstanding the place at which the truck is brought into engagement with the platform.

Figure 1:
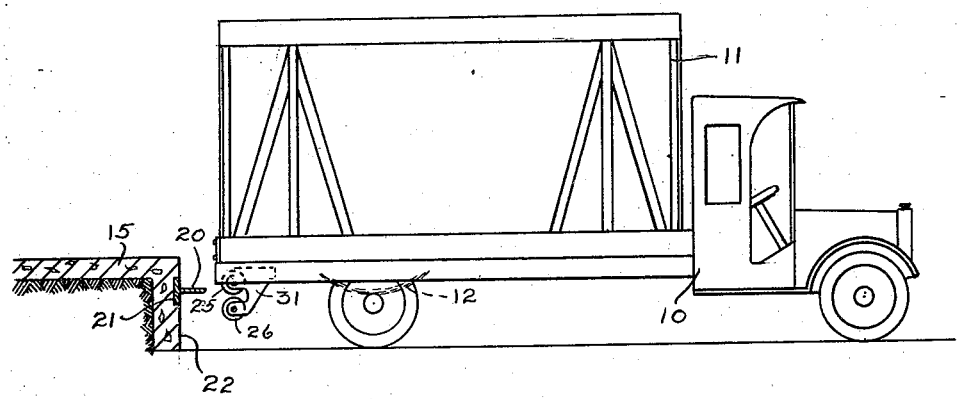
Figure 2:
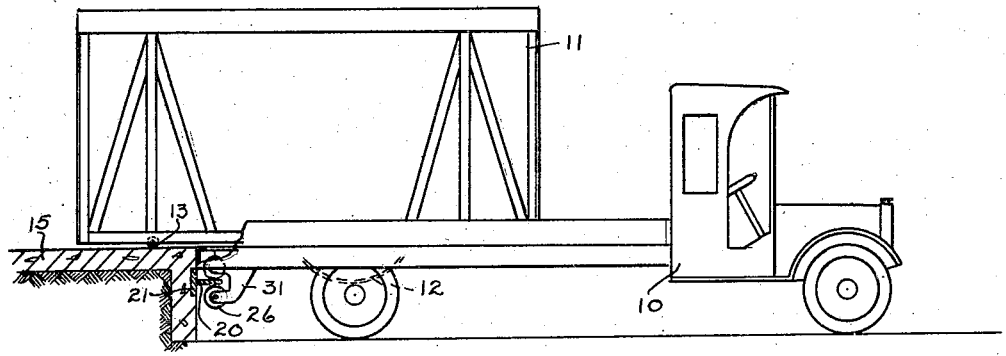
Figure 3:
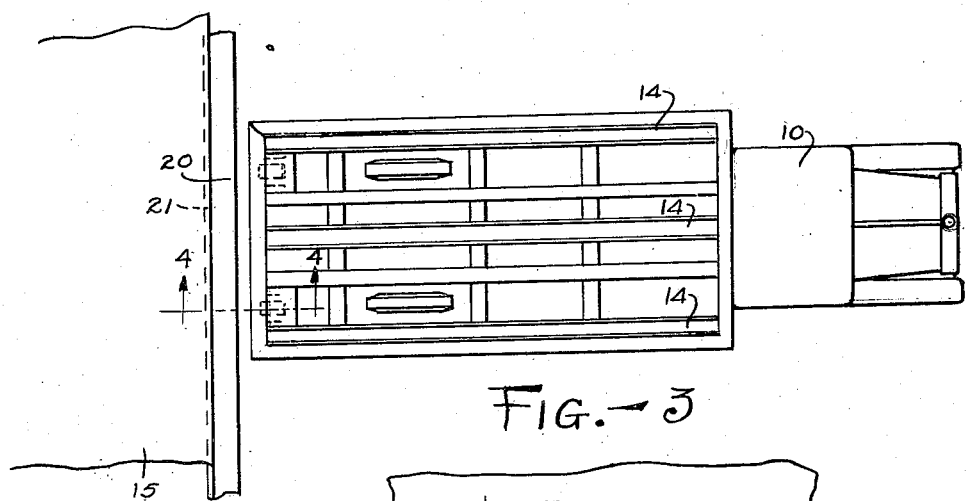
Figure 4:
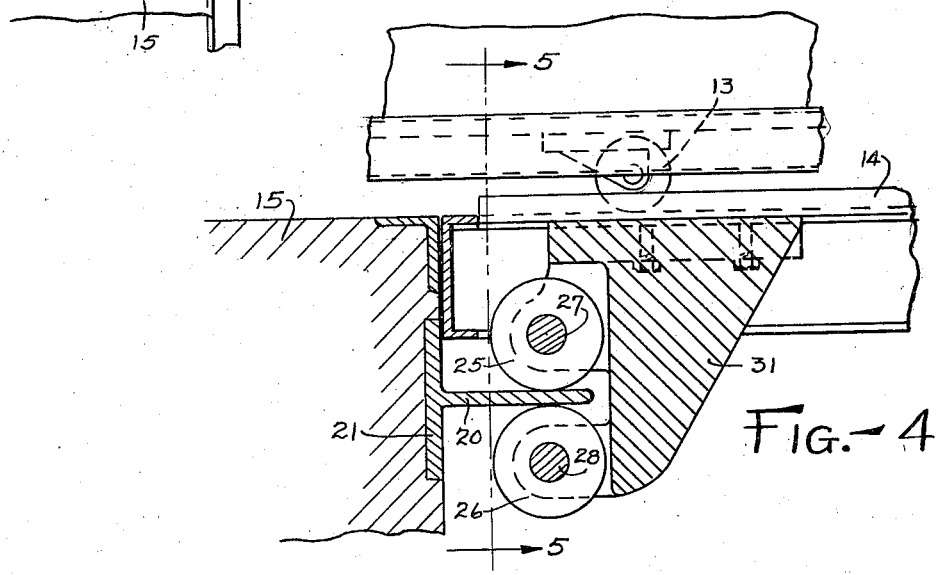
Figure 5:
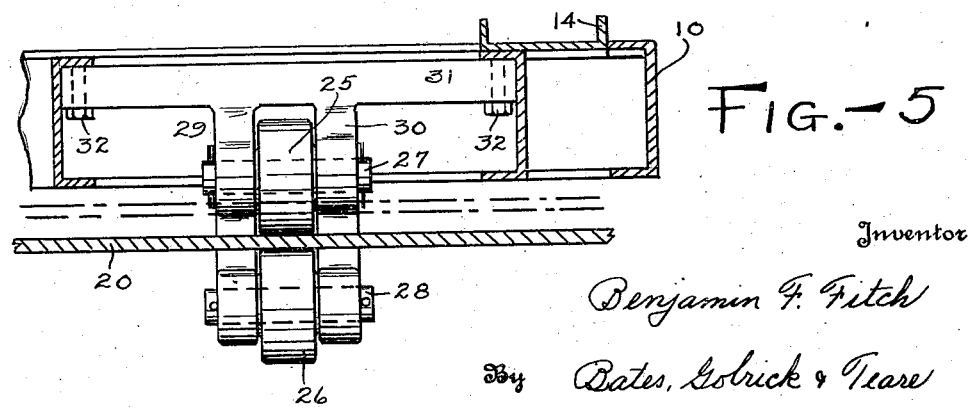

In the drawings, I have shown a preferred form of apparatus for carrying out my invention, wherein Fig. 1 is a side elevation of a motor truck having a demountable body thereon with a platform being shown in section adjacent the end of the truck; Fig. 2 shows the truck in engagement with the platform, with my invention operating to maintain the floor surfaces in alignment; Fig. 3 is a plan view of a truck adjacent the platform with the body removed from the truck; Fig. 4 is a vertical section on an enlarged scale taken on the line 4—4 in Fig. 3 and Fig. 5 is a vertical section taken through the truck on the line 5—5 in Fig. 4.

A conventional form of truck is illustrated at 10 as being arranged to support a container 11, and as having springs 12 which connect the truck chassis to the rear axles. The container may be removed horizontally from the truck and to this end, the bottom of the container is shown as being provided with casters 13 which move in trackways 14 extending longitudinally of the truck floor. A platform is indicated at 15 as having a floor surface which is approximately the same vertical distance above the ground as the floor of the truck. Inasmuch as the level of the truck surface will vary with the load in the container, it is desirable that the platform level be higher than the maximum load and lower than the minimum load. Thus, provision can be made for raising the truck floor of a loaded truck and lowering the floor of an empty truck.

To effect such raising of the truck floor with reference to the platform floor, I provide roller members which co-operate with a guiding member. In the preferred form, the roller members are mounted upon the truck while the guiding member is mounted upon the platform. The guiding member is illustrated as a plate 20 which extends outwardly from the platform and beneath the floor surface thereof. In the preferred form, the plate is a horizontal web of a T-bar, the vertical web 21 of which is fastened to the vertical edge 22 of the platform. If desired, the guiding member 20 may extend the entire length of the platform, thus enabling a truck to be backed into the platform at any desired place. This is particularly advantageous where the platform is long enough to accommodate a large number of motor trucks.

The roller members on the truck comprise an upper roller 25, and a lower roller 26, which are mounted on axles 27 and 28 respectively. These axles are carried by arms 29 and 30 which are preferably integral with a bracket 31. Securing members 32 may be utilized for attaching the bracket to the truck frame. The axes of the rollers extend transversely of the truck body and lie in a common vertical plane. In addition, the axes are spaced apart sufficiently to permit the guiding member to pass between the rollers, as is illustrated in Fig. 4 when the truck is backed into engagement with the platform. The position of the rollers with reference to the truck frame is such that when the guiding member is disposed between the rollers, the floor level is aligned with the floor level of the platform. In practice, I employ two sets of rollers, one on each side of the truck as is illustrated in Fig. 3.

An object of the present invention is to provide means for obtaining alignment of the platform and truck floor surfaces in a simple and expeditious manner, and to devise a construction which will operate in a satisfactory manner with the minimum amount of friction between the truck and platform.

From the foregoing description, it is obvious that my invention provides a simple rugged construction which functions to align the floor surfaces of the truck and platform in an effective manner and yet minimizes frictional contact between the truck and platform. By utilizing a guiding member which extends longitudinally of the platform and corresponding roller members on the trucks, it is an easy matter to effect proper alignment of the floor surfaces at any place along the platform edge. This has an important practical advantage, as it eliminates the necessity for the construction of trackways into which the truck must be backed to affect alignment between guiding members which are mounted at predetermined points on the platform.

I claim:

1. In combination, a road vehicle, a loading platform therefor, a tongue extending outwardly from the platform, and a pair of rollers carried by the vehicle, the tongue being adapted to extend between the rollers for aligning the floor surfaces of the vehicle and platform.

2. In combination, a spring supported road vehicle, a loading platform for said vehicle, a laterally extending member carried by the platform beneath the floor surface thereof, and roller members carried by the vehicle beneath the floor surface thereof, said members being spaced apart sufficiently to admit said member therebetween when the vehicle is brought into close relationship with the platform, whereby said member and rollers co-operate to lift or lower the chassis of the vehicle to align the floor surface thereof with the platform floor.

3. In combination, a road vehicle, a loading platform therefor, a flat plate projecting from the platform beneath the plane of the floor surface thereof and extending horizontally along the platform for a distance greater than the width of said vehicle, and spaced roller members mounted on the vehicle and adapted to engage either the top or bottom surface of said member to effect alignment of the roller surfaces of the vehicle and platform.

4. In combination, a motor truck, a loading platform therefor, and coacting guiding means on the platform and truck for aligning the floor surfaces of the platform and truck, said guiding means including respectively a projecting tongue and a pair of spacially arranged rollers one above the other.

In testimony whereof, I hereunto affix my signature.

BENJAMIN F. FITCH.